(12) United States Patent
Lucas et al.

(10) Patent No.: US 7,565,789 B2
(45) Date of Patent: Jul. 28, 2009

(54) BANDING MACHINE

(75) Inventors: William Lucas, 1596 Churchill Street, Chambly, Quebec (CA) J3L 4C3; Mario Lalancette, Chambly (CA)

(73) Assignee: William Lucas, Chanbly, Quebec (CA)

( * ) Notice: Subject to any disclaimer, the term of this patent is extended or adjusted under 35 U.S.C. 154(b) by 0 days.

(21) Appl. No.: 11/973,728

(22) Filed: Oct. 10, 2007

(65) Prior Publication Data

US 2008/0086987 A1    Apr. 17, 2008

(30) Foreign Application Priority Data

Oct. 11, 2006    (CA)    .................................... 2563247

(51) Int. Cl.
*B65B 11/00*    (2006.01)
(52) U.S. Cl. ............................. 53/582; 100/9
(58) Field of Classification Search .................. 53/399, 53/556, 582, 583, 585; 100/9
See application file for complete search history.

(56) References Cited

U.S. PATENT DOCUMENTS

| 3,186,333 | A | * | 6/1965 | Hoffman et al. ............... 100/9 |
| 3,563,002 | A | * | 2/1971 | Givin ........................... 53/567 |
| 3,572,396 | A | * | 3/1971 | Hoffman ....................... 100/9 |
| 3,974,628 | A | * | 8/1976 | Konstantin ................... 53/585 |
| 4,480,536 | A | * | 11/1984 | Burns ........................... 53/585 |
| 4,570,415 | A | * | 2/1986 | Centeno ....................... 53/399 |
| 4,579,027 | A | * | 4/1986 | Lewis ............................ 83/28 |
| 4,601,155 | A | * | 7/1986 | Lewis ........................... 53/399 |
| 4,794,832 | A | * | 1/1989 | Trimble ........................ 83/23 |
| 5,588,278 | A | * | 12/1996 | Wynn et al. .................... 53/399 |
| 7,257,934 | B2 | * | 8/2007 | Swift et al. ................... 53/399 |
| 2005/0172575 | A1 | * | 8/2005 | Swift et al. ................... 53/399 |

* cited by examiner

*Primary Examiner*—Louis K Huynh
(74) *Attorney, Agent, or Firm*—Eric Fincham

(57) ABSTRACT

A lobster banding machine having a tube feeder for feeding a tube of elastic material, a guillotine assembly to cut individual elastic bands from the tube material, jaws to grip and move the tube of elastic material, the gripping assembly having first and second arms, each arm having a finger mechanism mounted at a distal end for gripping a single elastic band.

7 Claims, 6 Drawing Sheets

BANDING MACHINE

FIELD OF THE INVENTION

The present invention relates to an apparatus and method, and more particularly relates to an apparatus suitable for placing an elastic about the pincers of a claw on a crustacean such as a lobster.

BACKGROUND OF THE INVENTION

A lobster is a crustacean which has found great favour with gourmets as a delicacy. The lobsters are lured to a trap placed on the bottom of the ocean with a buoy extending therefrom. The lobsters enter the trap and are unable to escape. Periodically, the lobster fishermen will raise the trap and remove therefrom any lobsters meeting the required size limitations.

With their powerful claws, lobsters represent a danger to the fishermen, the consumer and anyone else handling the lobster. Indeed, they represent a danger even to other lobsters as lobsters will attack each other.

In order to obliviate the above problem, the lobster fisherman will place an elastic band about the claws such that they are unable to be opened. To date, this has been done in a manual manner wherein the lobster fisherman has a supply of rubber bands and a tool is utilized to stretch the band and place it about the pincers of the claw.

There have been proposals to automate the placement of the rubber bands on the claws. However, the machines developed for such a purpose have not received commercial acceptance.

SUMMARY OF THE INVENTION

It is an object of the present invention to provide an automated apparatus adapted to place an elastic band about the claws of a lobster.

According to one aspect of the present invention, there is provided a lobster banding machine comprising a tube feeder for feeding a tube of elastic material, a guillotine assembly, the guillotine assembly being operative to cut individual elastic bands from the tube material, and a gripping assembly comprising first and second arms, a drive motor for pivotably driving each of the arms, and a finger mechanism mounted at a distal end of each of the arms, means for axially moving each of the fingers between a retracted position and an extended position.

The machine of the present invention is designed to be utilized with a tubular band of elastic material. Such tubular bands are well known in the art and readily available commercially.

The band is fed into the machine through a pair of rollers which are essentially one-way rollers—i.e. they will permit the advancement of the rubber tube therethrough but they prevent withdrawal.

A pair of jaw assemblies are utilized to advance the elastic tube within the machine. The jaw assemblies are designed to clamp down on opposite sides of the rubber band, advance the same for a length equivalent to the desired width of the elastic band. The jaws then move away from the tube and return to their original position.

The guillotine assembly is designed to cut the elastic tube into the individual bands. To this end, there are provided a pair of knife assemblies. Though both knife assemblies could be moveable, it is preferred that only one of the knives move to meet the other. In a preferred embodiment, the knives operate in a scissor like fashion.

Following the production of the individual elastic bands, each one is moved to a position whereby it may be placed about the claw of a lobster. In the preferred embodiment, a pair of arms having retractable fingers are moved into position after the formation of the elastic band to tension the same and move it to a position where it may be placed about the lobster claw. In order to activate the same, a proximity sensor may be utilized.

Though the invention is described with respect to the claws of lobsters, it will be appreciated that the machine may be utilized to place elastic bands about any desired object.

BRIEF DESCRIPTION OF THE DRAWINGS

Having thus generally described the invention, reference will be made to the accompanying drawings illustrating an embodiment thereof, in which:

FIG. 7 is a view taken along the lines 7-7 of FIG. 6a;

FIGS. 8a and 8b are Figures illustrating use of the guillotine assembly;

DETAILED DESCRIPTION OF THE INVENTION

Figure 1:
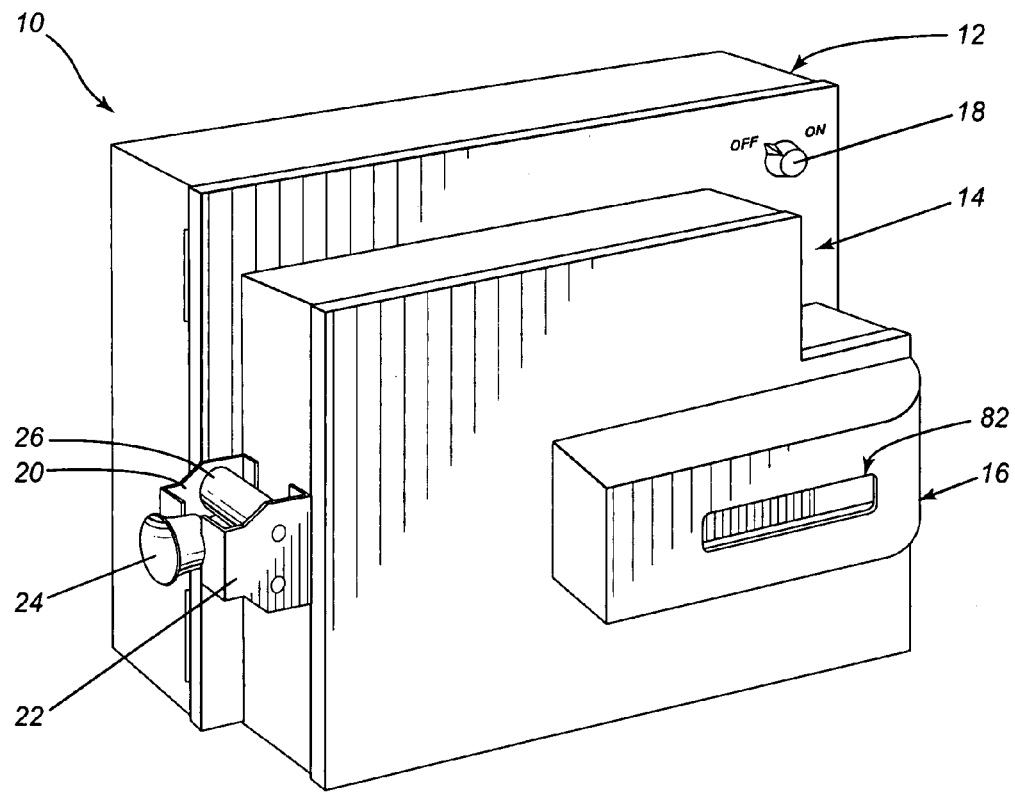
FIG. 1 is a perspective view of the claw banding machine.
Figure 2:
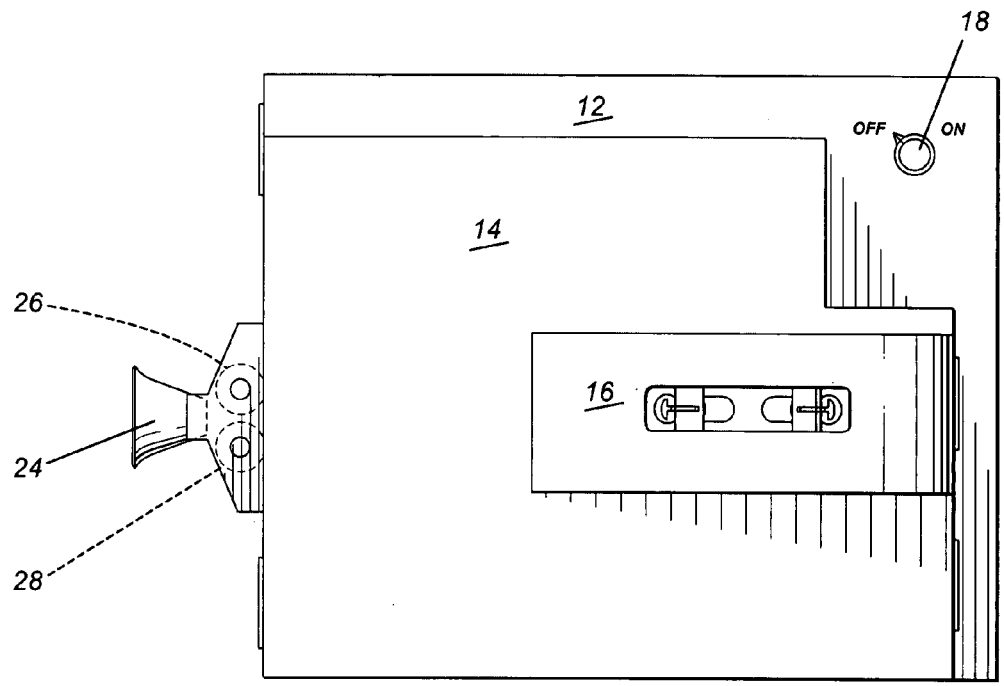
FIG. 2 is a side elevational view thereof.
Figure 3:
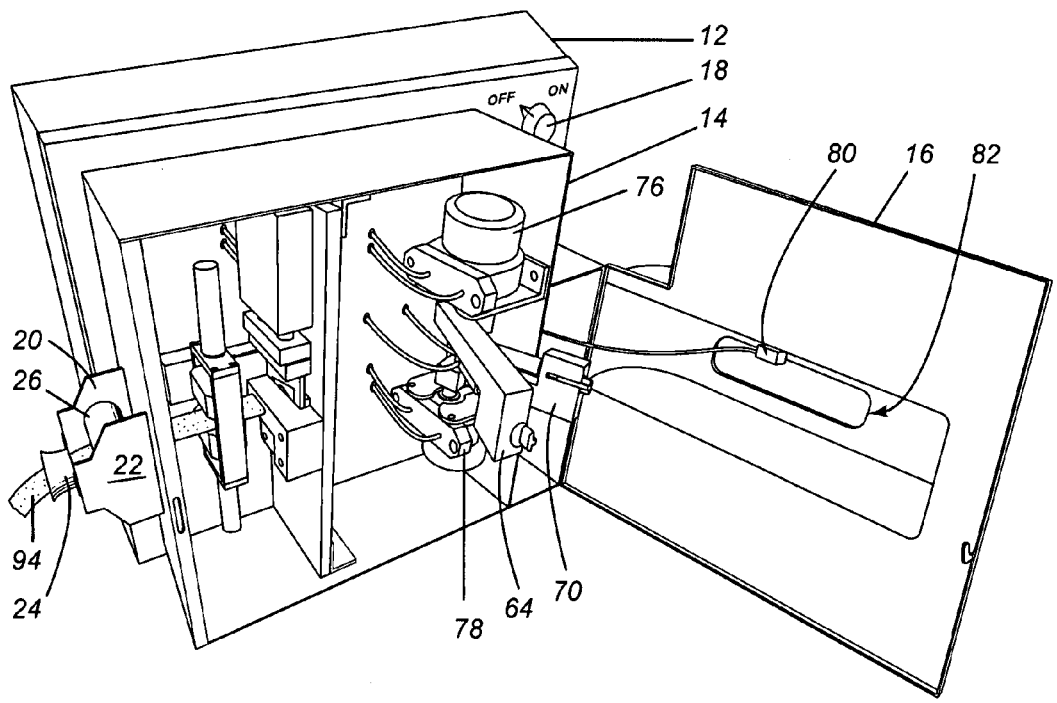
FIG. 3 is a perspective view of the machine with the middle compartment open illustrating the components of the machine.
Figure 4:
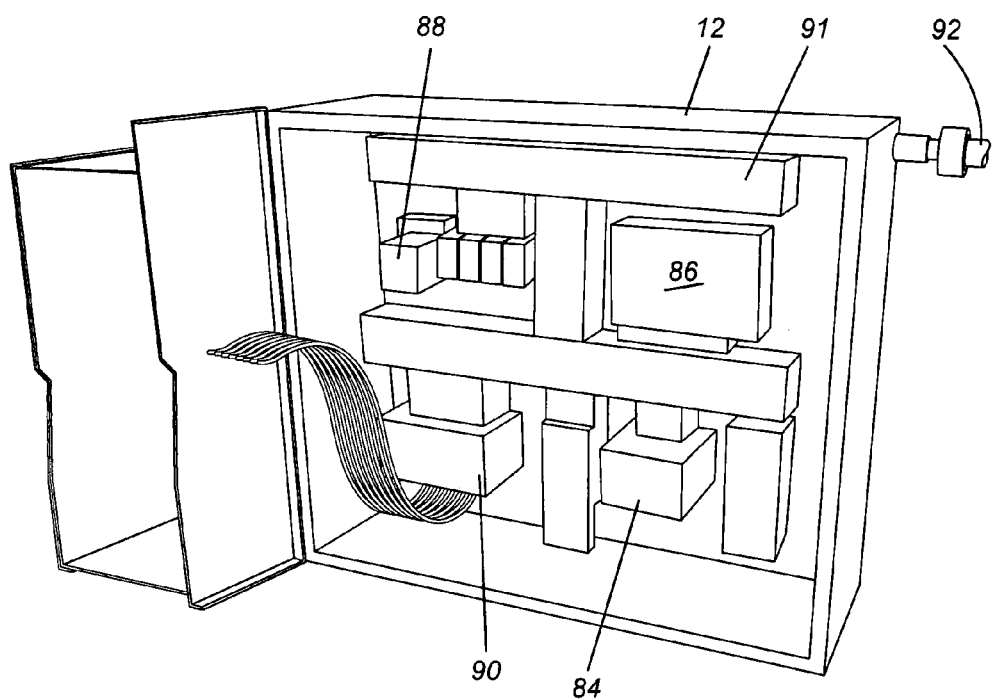
FIG. 4 is a perspective view of the rear portion of the machine with the door open.

Referring to the drawings in greater detail and by reference characters thereto, there is illustrated in FIG. 1 a banding machine which is generally designated by reference numeral 10. Banding machine 10 includes a rear housing generally designated by reference numeral 12, a central housing generally designated by reference numeral 14, and a front housing generally designated by reference numeral 16.

In general, central housing 14 houses the operational components of the machine with rear housing 12 generally having the control mechanisms mounted therein.

Mounted on the exterior of rear panel 12 is a power switch 18 as is conventional.

Leading into central housing 14 is a funnel 24 which is held in position by means of a pair of brackets 20, 22. Brackets 20, 22 also journal an upper roller 26 and a lower roller 28. Rollers 26, 28 are one-way rollers as is known in the art.

Figure 5A:
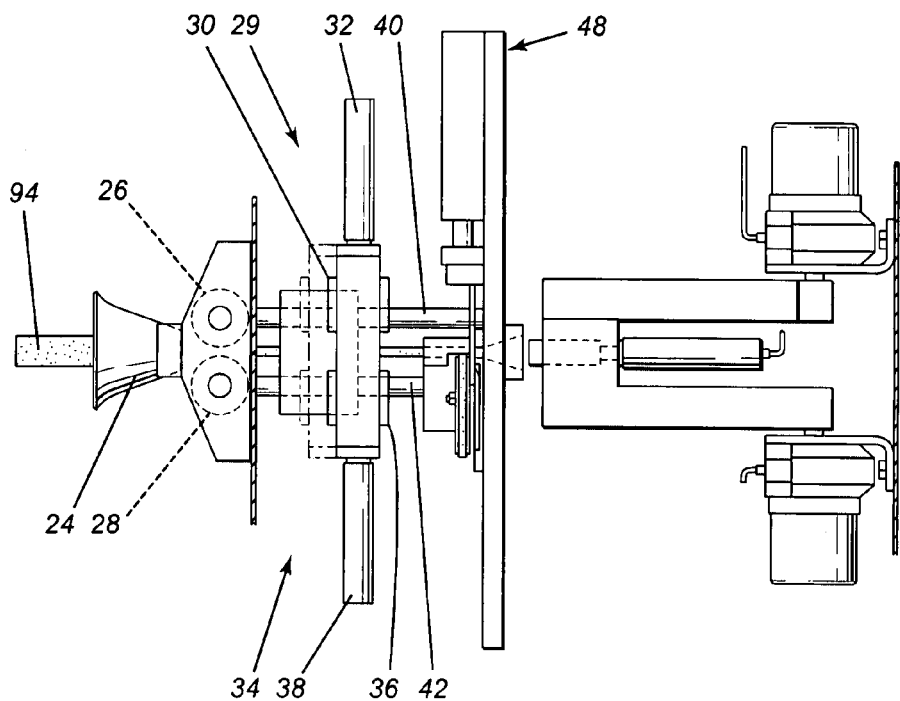
FIG. 5a is a side elevational view of the middle compartment.
Figure 5B:
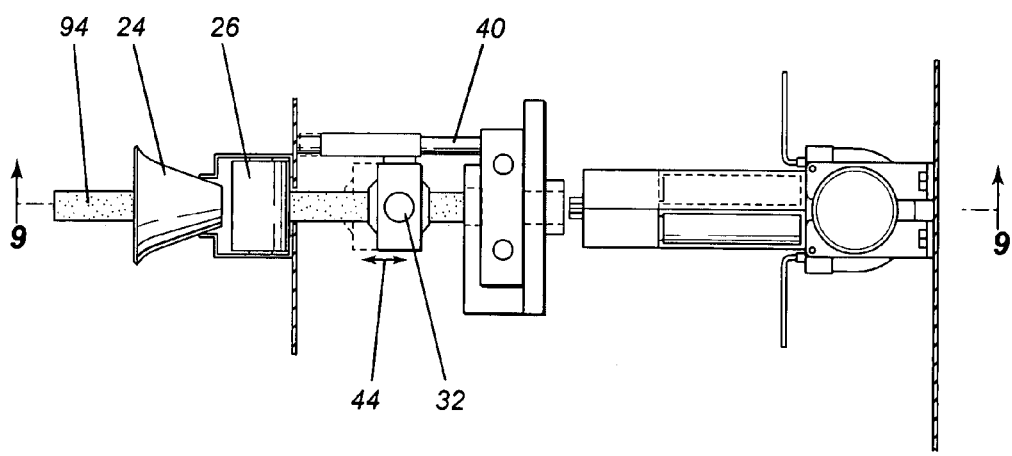
FIG. 5b is a top plan view thereof.
Figure 9:
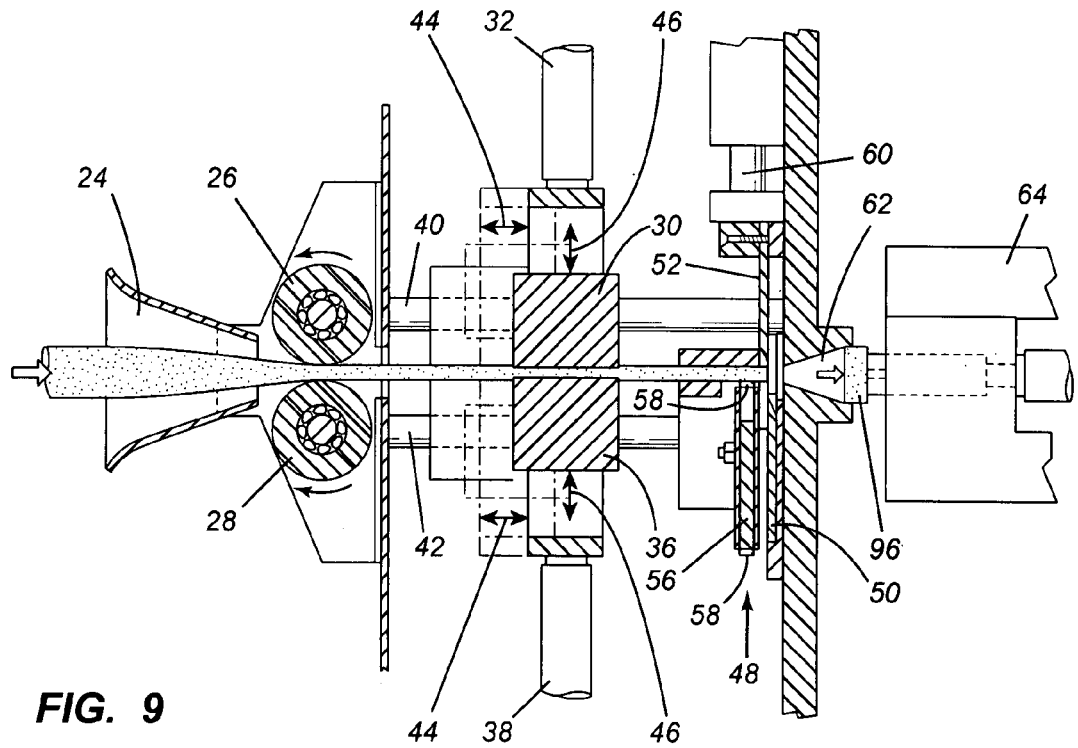
FIG. 9 is a side elevational view showing operation of the jaws for advancement of the elastic tube.

As may be seen in FIGS. 5a and 5b, there is provided an upper jaw assembly which is generally designated by reference numeral 29. Upper jaw assembly 29 includes an upper jaw 30 and an upper jaw piston 32. There is also provided a lower jaw assembly generally designated by numeral 34 and which includes a lower jaw 36 and a lower jaw piston 38. Pistons 32 and 38 are designed to move their respective jaws towards and away from each other. Upper jaw assembly 29 is mounted on an upper rail 40 while lower jaw assembly 34 is mounted on lower rail 42. As shown in FIG. 9, pistons 32 and 38 are designed to move their respective jaw members as shown by arrows 46. Each of upper jaw assembly 29 and lower jaw assembly 34 are moveable along respective upper rail 40 and lower rail 42 as indicated by arrows 44. The horizontal movement may be achieved through suitable pistons (not shown).

The claw banding machine 10 also includes a guillotine or cutter assembly generally designated by reference numeral 48. The guillotine assembly includes a lower blade 50 and an upper blade 52 with upper blade 52 being driven by means of a piston 60. Lower blade 50 is essentially stationary. Each of lower blade 50 and upper blade 52 are angled so as to provide a scissor cutting action.

Mounted about a frame member 56 is a resilient member 58 which is utilized to reposition the elastic tube material following a cutting action. Resilient member 58 may conveniently comprise a member formed of an elastic material.

Following the guillotine assembly 48, there is provided an exit funnel 62. Exit funnel 62 changes from an oval shape to a circular shape at its output end.

The elastic gripping assembly generally designated by reference numeral 63 includes a first arm 64 which is pivotably mounted and which has, at its extremity, a finger 66. Finger 66 is moveable along the axis of arm 66 by means of a piston 68. Similarly, there is provided a second arm 70 which is also pivotably mounted and which has an axially moveable finger 74 driven by piston 72.

The pivotable movement of first arm 64 and second arm 70 are achieved through use of respective motors 76, 78.

Front housing 16 includes an aperture 82 in its front wall and a proximity sensor 80 mounted adjacent thereto.

Mounted in rear housing 12, are the control mechanisms which would include a power supply 84, a circuit board 86, relays 88 and a manifold 90. It will be understood that it is well within the skill of one knowledgeable in the art to devise suitable controls.

Manifold 90 is supplied with air through an air entry 92.

In operation, an elastic tube 94 is fed through funnel 24 and between upper roller 26 and lower roller 28. As previously mentioned, rollers 26 and 28 are one-way rollers to prevent any retraction of the elastic tube 94.

Elastic tube 94 is advanced by means of upper jaw 30 and lower jaw 36. As best seen in FIG. 9, cylinders 32 and 38 are activated such that jaws 30 and 36 grip elastic tube 94. Subsequently, upper jaw assembly 29 and lower jaw assembly 34 are moved along rails 40, 42 as indicated by arrows 44 to advance the elastic 94.

After one advancing motion, guillotine assembly 48 is activated such that upper blade 52 is driven in a scissor like movement towards lower blade 50 such that an individual elastic 96 is then formed. Elastic member 96 will then pass through exit funnel 62. As previously mentioned, exit funnel 62 takes the oval configuration-of the elastic after cutting and forms into a circular configuration.

Figure 6A:
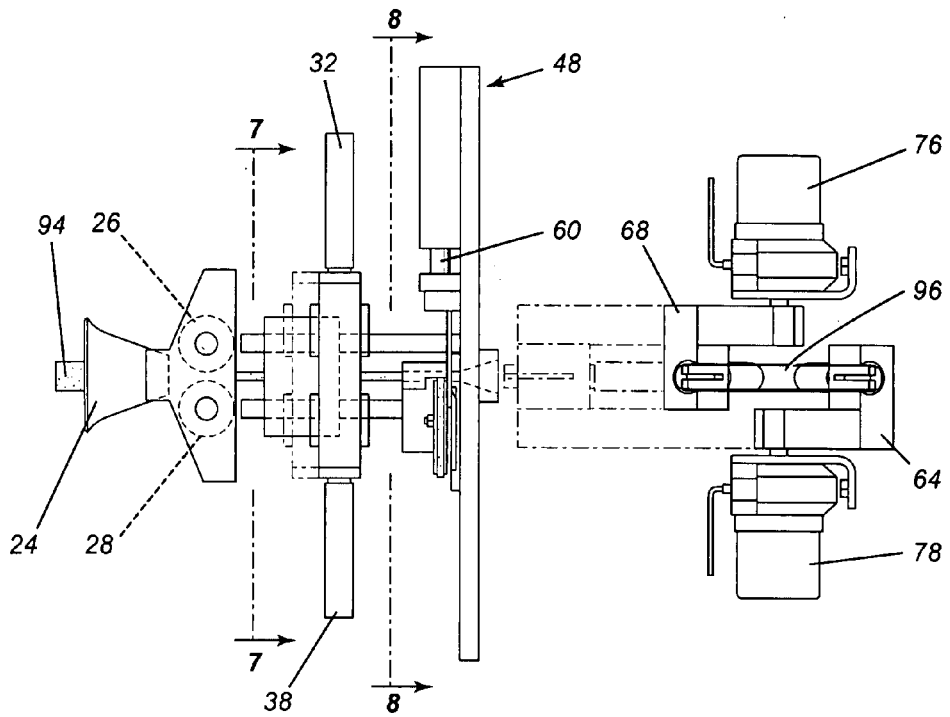
FIG. 6a is a front view similar to FIG. 5a but with the arms moved to the banding position.
Figure 6B:
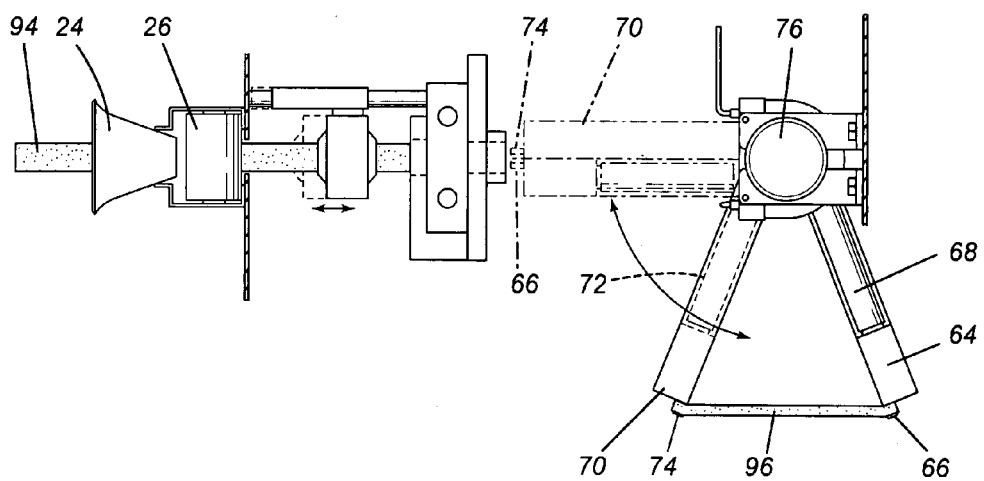
FIG. 6b is a top plan view thereof.
Figures 7, 8A, 8B:
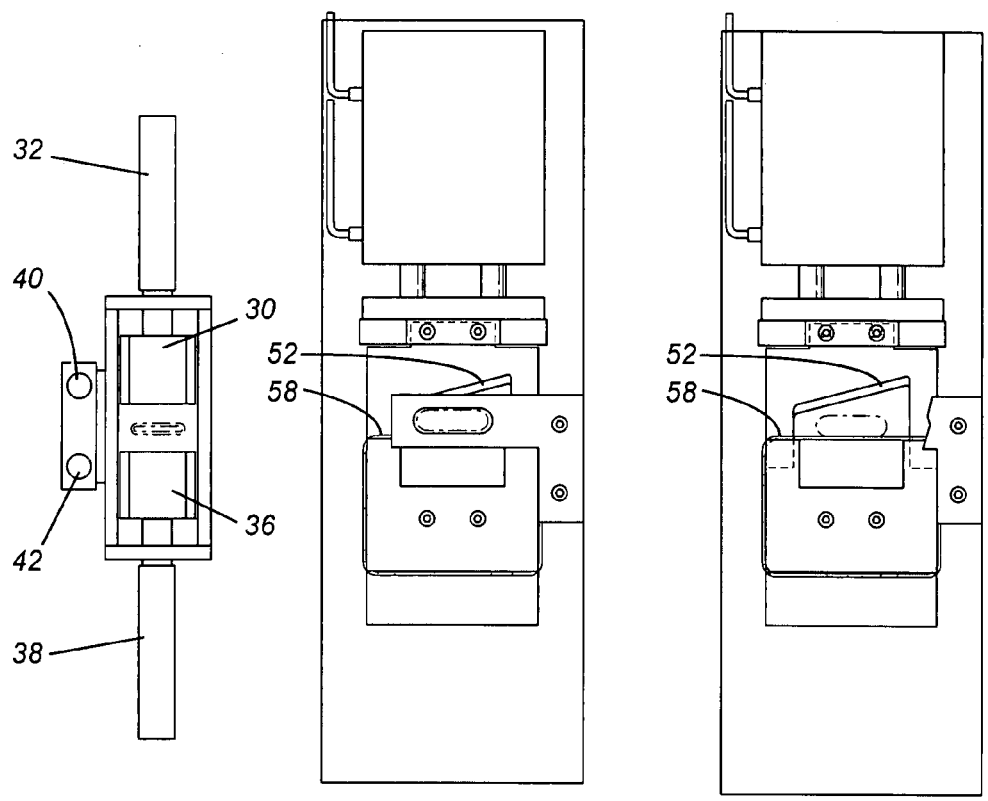
Figure 10:
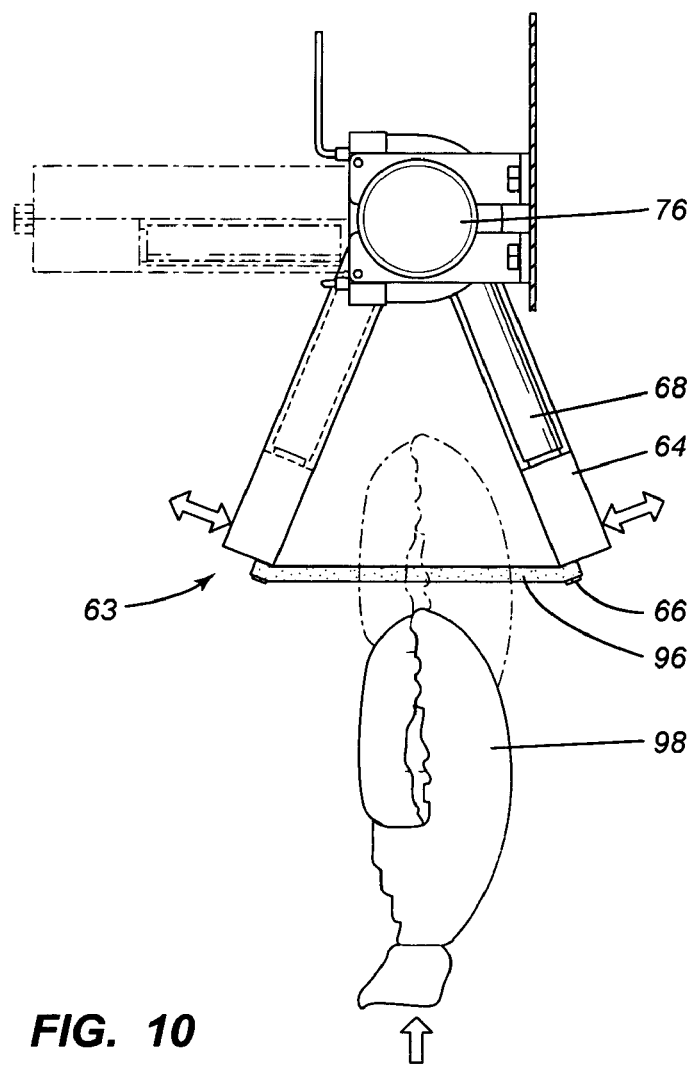
FIG. 10 is a top plan view illustrating placement of the claw for banding.
Figure 11:
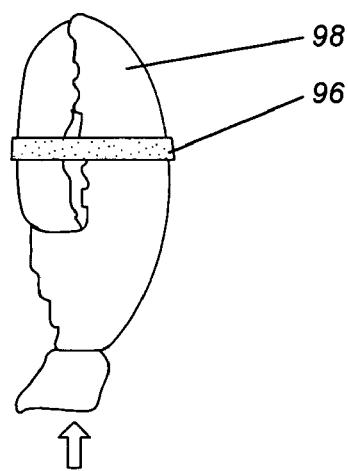
FIG. 11 is a plan view of the banded claw.

First arm 64 and second arm 70 are then activated to move through the position shown in FIGS. 5a and 5b. Pistons 68 and 72 are then activated to push respective fingers 66 and 74 inside exit funnel 62. A movement to stretch the elastic then occurs through motors 76 and 78 and arms 64 and 70 are pivotably driven to the position illustrated in FIGS. 6a and 6b. As shown in FIG. 10, the elastic is stretched and a lobster claw 98 is inserted through aperture 82. Proximity sensor 80 detects this and causes movement of arms 64, 72 such that the elastic member 96 is placed thereabout as shown in FIG. 11. The cycle is then repeated as required.

It will be understood that the above described embodiments are for purposes of illustration only and that changes and modifications may be made thereto without departing from the spirit and scope of the invention.

We claim:

1. A lobster banding machine comprising:
   a tube feeder for feeding a tube of elastic material;
   a guillotine assembly, said guillotine assembly being operative to cut individual elastic bands from said tube material;
   a funnel to receive elastic bands from said guillotine assembly, said funnel changing from an oval to a circular configuration in the direction of advancement of the elastic bands; and
   a gripping assembly for receiving said elastic bands from said funnel comprising first and second arms, a drive motor for pivotably driving each of said arms, and a finger mechanism mounted at a distal end of each of said arms, means for axially moving each of said fingers between a retracted position and an extended position.

2. The machine of claim 1 wherein said tube feeder includes a pair of rollers to receive said tube of elastic material therebetween, each of said rollers permitting movement in only one direction.

3. The machine of claim 1 wherein said tube feeder comprises first and second jaw assemblies, each of said jaw assemblies being operative to clamp said tube of elastic material therebetween, and means for moving said jaw assemblies a predetermined distance to thereby feed said elastic material to said guillotine assembly.

4. The machine of claim 1 wherein said guillotine assembly includes first and second blades, one of said blades being moveable.

5. The machine of claim 4 wherein said blades are angled with respect to each other to provide a scissor like cutting movement.

6. The machine of claim 1 further including a housing, an opening in said housing, and a proximity sensor located at said opening.

7. The machine of claim 1 further including an elastic member at said guillotine assembly.

* * * * *